Oct. 10, 1961  B. W. ANDERSON  3,003,371
DRILLING AND/OR TAPPING APPARATUS
Filed March 4, 1959  6 Sheets-Sheet 1

Fig. 1.

INVENTOR
BERNARD WILLIAM ANDERSON
BY
Irwin S. Thompson
ATTORNEY

Oct. 10, 1961    B. W. ANDERSON    3,003,371
DRILLING AND/OR TAPPING APPARATUS
Filed March 4, 1959    6 Sheets-Sheet 3

INVENTOR
BERNARD WILLIAM ANDERSON
BY
Irwin S. Thompson
ATTORNEY

Oct. 10, 1961  B. W. ANDERSON  3,003,371
DRILLING AND/OR TAPPING APPARATUS
Filed March 4, 1959  6 Sheets-Sheet 4

INVENTOR
B.W. ANDERSON
BY
Irwin S. Thompson
ATTORNEY

United States Patent Office 3,003,371
Patented Oct. 10, 1961

3,003,371
DRILLING AND/OR TAPPING APPARATUS
Bernard William Anderson, Dunstable, England, assignor to Engineering Research and Application Limited, Dunstable, Bedfordshire, England
Filed Mar. 4, 1959, Ser. No. 797,070
Claims priority, application Great Britain Mar. 5, 1958
12 Claims. (Cl. 77—32.3)

This invention relates to drill heads which may also be made suitable for tapping screw-threads and the main object of the invention is to provide improved means for "pecking" i.e. advancing the drill to a short depth of cut and then alternately retracting the drill and advancing the drill to a greater depth of cut until the required depth is achieved. In addition it is desirable to arrange for fast retraction and approach speeds for the drill or tap, with slow drilling advance, and even slower advance for final breaking through of the drill through the drill exit side of the work. For tapping it is necessary to reverse the rotary direction of the tap.

According to the invention the pecking operation is controlled by electric circuit means which includes a pecking position control device comprising a series of electric contacts engageable progressively by a cooperating contact for completing an electric circuit which effects return movements of the holder, and a re-start switch for producing successive advance movements of said holder. The series of contacts may be mounted in a carrier in which they can be independently re-positioned to predetermine the pecking positions at which the return movements are successively initiated.

If desired damping means may be provided and brought into action by another switch (which may be termed the damping switch) after an initial quick advance on each advance stroke.

The advance and return movements of the holder may be effected by fluid pressure controlled by valve actuated by solenoids connected with the switches and pecking position control device.

A constructional form of the invention will now be described by way of example with reference to the accompanying diagrammatic drawings wherein.

The apparatus comprises a housing including a bed 12, end-plates 13, 14 and casing 15.

The plate 13 carries a bearing block 16 in which slides a ram 18. The ram 18 is also slidably mounted in another bearing block 19 mounted by long bolts 20, 21 on the plate 13.

A tool holder or quill 22 is rotatably mounted in the ram by means of roller thrust bearings 23, 24.

Packing rings are provided where required.

One end of the quill carries a tool holder, for example, a drill chuck mounting 26 and the other end 27 is splined and engaged by the spindle 28 of an electric motor (not shown) whereby the quill is driven rotatably while being free to slide axially for advance and return movements of the drill.

The blocks 16, 19 also form end closure plates of a cylinder 29 in which a piston head 30 is slidably engaged, said piston and cylinder forming means for advancing and returning the drill chuck mounting 26. This piston head consists of an assembly of packing rings attached by nuts 31 to the ram 18. Oil under pressure can be introduced into the cylinder at either side of the piston head for moving the ram 18 to effect advance and return movements of the drill. An air bleed 32 permits escape of any air trapped in the oil. Oil is supplied for advance through a pipe 35 and for return through a pipe 36.

Figures 5, 6:
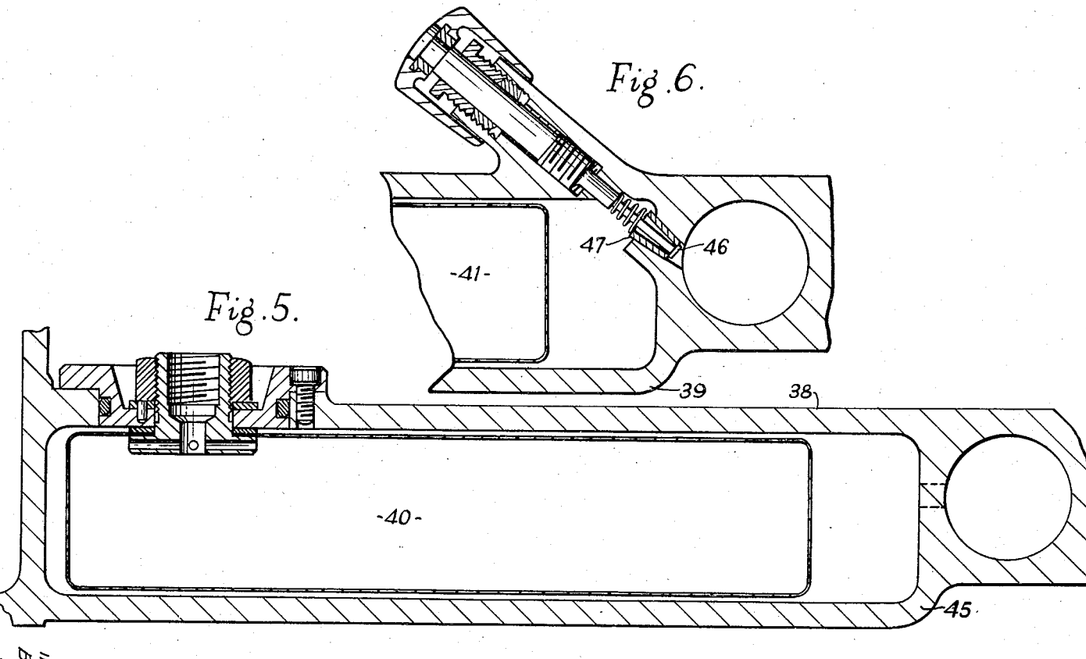
FIGURES 5, 6, 7 and 8 are details to be described.
Figure 9:
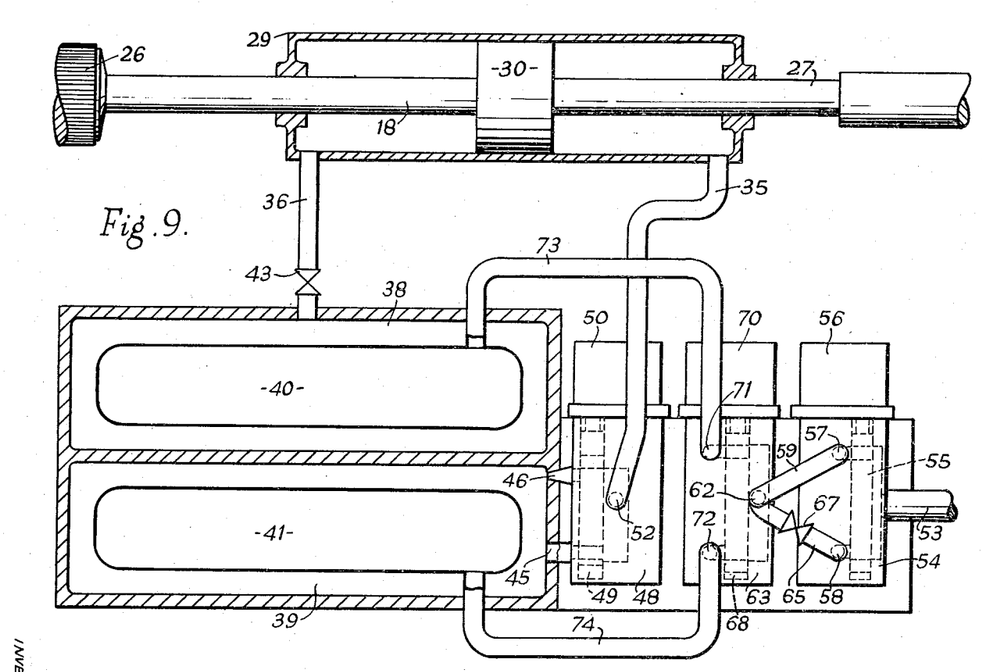
FIGURE 9 is a diagram of the fluid pressure system of the apparatus.

The cylinder 29 is supplied with oil from means for supplying oil under pressure, which means includes two cylinders 38, 39 both shown in FIGURE 9 and one of which is shown in greater detail in FIGURE 5 and part of the other is shown in FIGURE 6. These cylinders contain movable wall devices in the form of flexible bags 40, 41 into which air under pressure can be introduced so as to force the oil out through a valve into the appropriate end of the cylinder 29. The oil from chamber 38 passes to the pipe 36 past an adjustable restrictor valve 43 for restricting flow when tapping screw-threads, this valve being opened fully for drilling. The chamber 39 has two ports 45, 46 one (45) of which is a free flow port and the other of which contains a plug 47 held in to restrict flow therethrough in one direction but movable to provide free flow in the opposite direction. The ports 45, 46 lead to a valve chamber 48 controlled by a movable valve member 49 movable into two positions by a solenoid 50 and spring device. The valve chamber 48 is connected at 52 to pipe 35.

Air is fed to the apparatus at port 53 from a compressor (not shown). Port 53 leads to a chamber 54 that contains a valve member 55 movable into two positions by a solenoid and spring device 56 to direct air to a port 57 or a port 58. Port 57 leads by a pipe 59 giving free flow to a port 62 of another air chamber 63 while port 8 leads by pipe 65 to the same port 62 but via an air restrictor 67 for slow break-through speed. A control device for the piston 30 and cylinder 29 comprises the chamber 63 containing a movable valve member 68 that is movable into two positions by a solenoid 70 and spring device. The chamber 63 has two other ports 71, 72 leading by pipes 73, 74 to the bags 40, 41. In one position of valve member 68 air pressure is fed to 71 while 72 is connected to exhaust and in the other position air pressure is fed to 72 while 71 is connected to exhaust.

Figure 1:
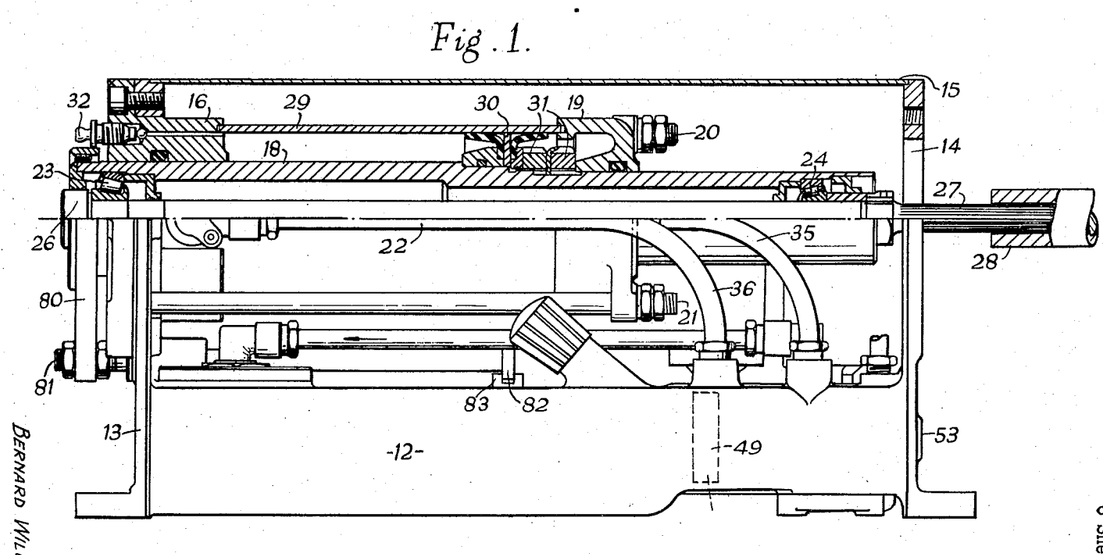
FIGURE 1 is a view partly in side elevation and partly in section of a drilling apparatus made in accordance with the invention.
Figure 2:
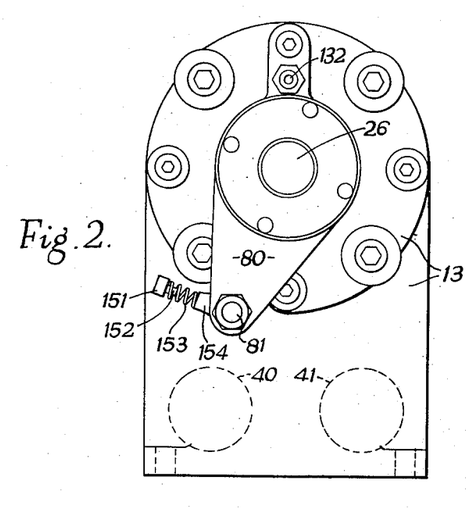
FIGURE 2 is an end elevation thereof.
Figure 3:
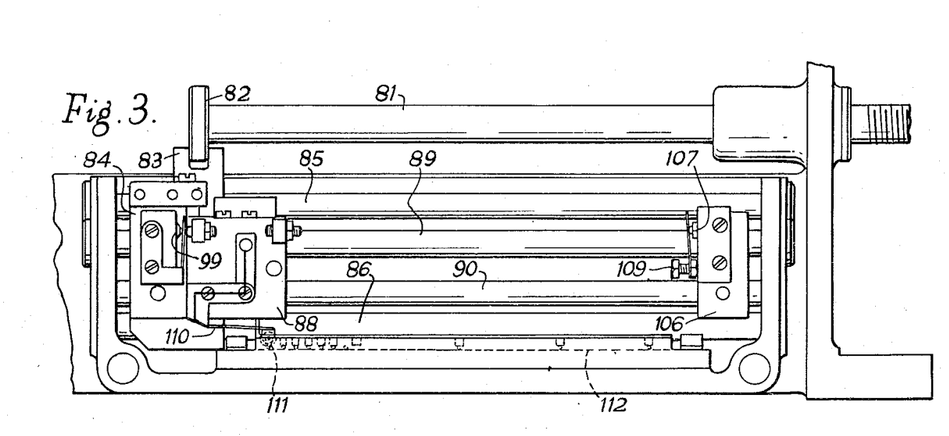
FIGURE 3 is a view looking in the same direction as FIGURE 1 but showing parts lying behind those shown in FIGURE 1.
Figure 4:
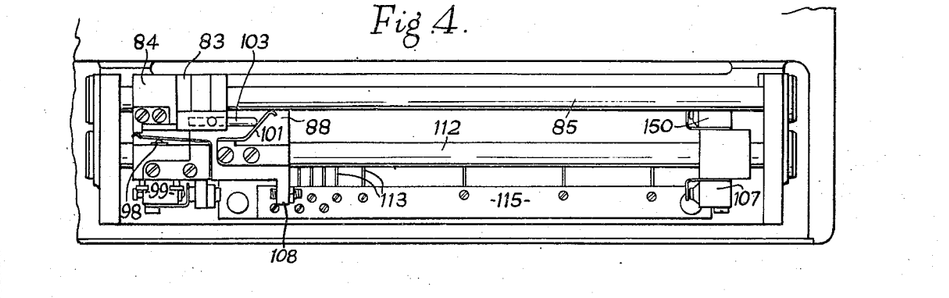
FIGURE 4 is a plan view of certain parts shown in FIGURE 3.
Figures 7, 8:
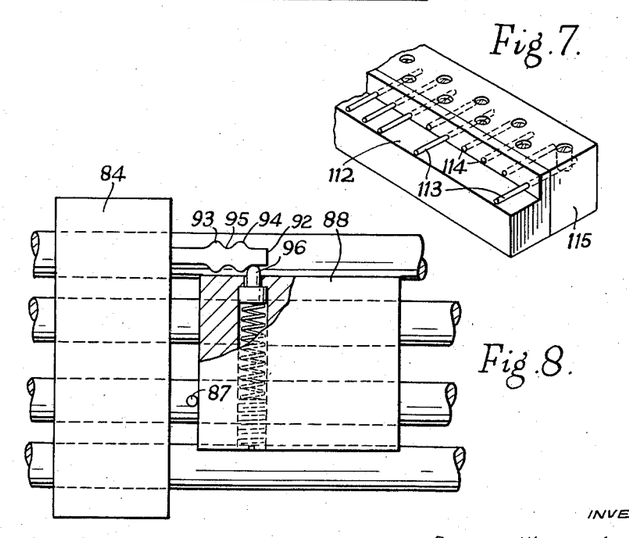

The ram 18 carries a plate 80 which is fixed to a rod 81 (FIGURES 1, 2, 3). The rod carries a projection 82 engaged in a fork 83 that is attached to a carriage 84 which slides on bars 85, 86 so that the carriage moves with the ram and quill on the advance and return movements. A slider 88 moves slidably along bars 89, 90. The carriage engages the slider and moves it forward during advance movements but the slider remains advanced while the carriage returns except for the final return when the carriage carries the slider back with it and for this purpose the carriage 84 has a nose 92 mounted thereon (FIGURE 8). This nose has annular ribs 93, 94 with a groove 95 between them. A spring pressed button 96 on the slider is engaged by the rib 94 to move the slider during advance movements but after the final break-through of the drill the nose moves further so that button 96 engages in groove 95 whereupon the carriage takes the slider back with it. At the end of the final retraction the slider 88 is brought to rest by engaging a stop 87 and the carriage continues to retract to disengage the nose 92 from the button 96.

The carriage and slider operate various switches to control the various operations. The carriage on its return movement operates switches 98, 99, 100 (see FIGURE 10) which respectively control (a) back stop switch to signal that the cycle is in normal operation, (b) reset switch for restarting the complete drilling cycle, and (c) reverse rotation switch for reversing the electric motor for tapping.

A contact arm 101 carried by the slider engages the rod 85 which serves as a bus-bar and this arm is disconnected from the rod 85 by a probe 103 mounted adjustably on the carriage. This arm 101 serves as a damping switch to slow down the advance rate of ram 18 when the carriage overtakes the slider i.e. when the drill arrives at the previous drilling position. A block 106 carries a break-through switch 107 for further slowing down the ram. This switch is operated by an adjustable stop 108 on the slider 88. The block 106 also carries a front adjustable stop 109 which serves to limit the forward movement of the slider 88 whereupon the carriage 84 continues to move to engage the nose 92 with the button 96. A further switch 150 serves to signal the completion of the operation.

The slider 88 carries switching means comprising a spring arm 110 which carries a roller 111 that runs on a track 112 of insulating material along which are disposed a series of contact pins 113 connected to a common conductor bar 115. These pins can be set in any of a number of holes 114 in the track member 112 whereby they can be re-positioned to predetermine the forward "pecking" positions at which successive return movements are required.

Figure 10:
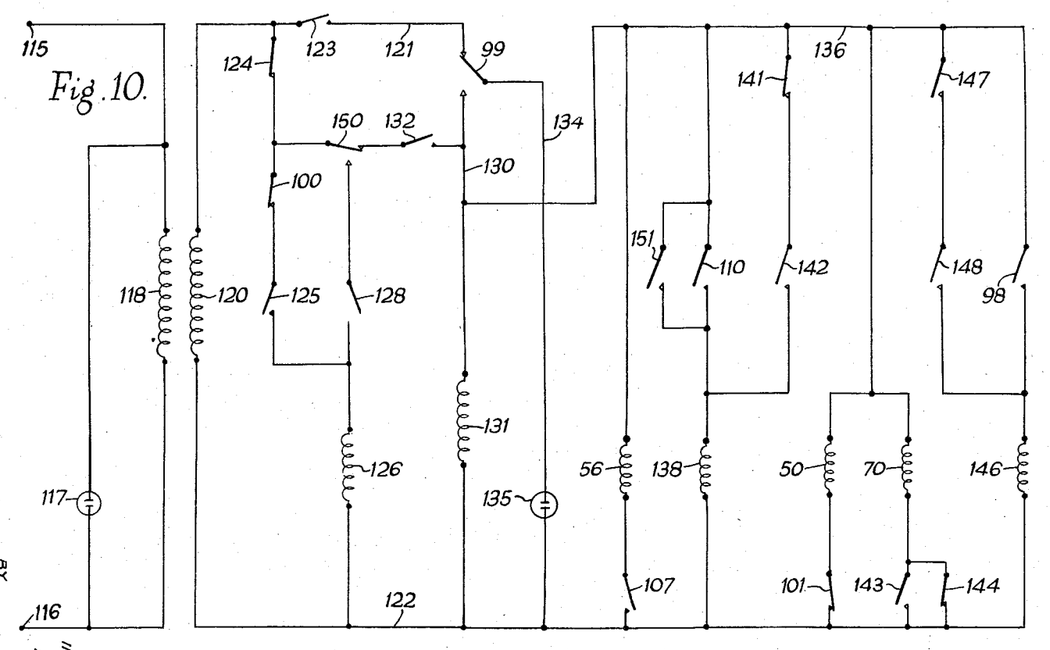
FIGURE 10 is a diagram of the electric system of the apparatus.

The electric circuit shown in FIGURE 10 also includes terminals 115, 116, an indicator lamp 117 connected across the mains, and the primary coil 118 likewise connected across the mains. The transformer secondary coil 120 provides a potential drop between a live line 121 and a neutral line 122. The line 121 contains a start switch 123. Connected across the lines 121, 122 are a stop switch 125, and a relay coil 126, all in series. The coil 126 operates switch 125 for reverse drive of the motor. Connected across the switches 100, 125 are the switch 150 and a switch 128, the latter being open for drilling and closed for tapping.

Also connected across the lines 121, 122 is a conductor line 130 containing the switch 99 and a relay coil 131 that actuates a switch 132 connected between 109 and the line 130.

The switch 99 can connect 121 with the line 130 or with another line 134 which is connected to one terminal of a "reset lamp" 135 the other terminal of which is connected to the line 122. If this lamp is on at the commencement of a cycle of operation it indicates that the carriage has not been returned to its starting position.

A further live conductor line 136 is connected to the line 130 and connected between the lines 136, 122 are the following:

(1) The solenoid coil 56 in series with switch 107.
(2) A relay coil 138 and the switch 110. Across the switch 110 are connected two switches 141, 142 in series.
(3) The solenoid coils 50, 70 in parallel with each other and switches 101 in series with the coil 50 and switches 143, 144 in series with the coil 70 and in parallel with each other.
(4) A relay coil 146 and switch 98 in series with each other, with two switches 147, 148 in series with each other and in parallel with the back-stop switch 98.

The switches are shown in their normal or at rest position.

The relay coil 138 when energised operates the switches 147, 144, 142.

The relay coil 146 when energised operates the switches 148, 143, 141.

The sequence of operation is as follows:
(1) Press the start button to close switch 123 which holds on.

If the switch 99 is in the position shown the lamp 135 will light, indicating carriage is not in place. If carriage is in its correct position the switch 99 will be connected with line 130 and the coil 131 will be energised. This closes switch 132 and starts the motor.

Power is now supplied to the solenoid coils 50 and 70 which are energised and this causes air to flow from supply port 53 through port 57 to port 62 and out of port 72 to the bag 41. This forces oil through the port 45, valve 49 and pipe 35 to the cylinder 29 to drive the tool holder 18 forwards with a fast approach movement.

(2) The carriage rides off the reset switch 99 which returns to the position shown but no change results.

(3) The carriage is pulled forward until the damping switch 101 is opened the damping solenoid 50 is de-energised. The valve 49 reverses and oil now flows out through the restrictor port 46 to outlet port 52 and pipe 35 thus giving slow forward speed (i.e. drilling speed).

(4) The carriage proceeds forward at damped speed, until the pecking switch 110 is closed which energises the relay coil 138 and switches 147, 142 close and 144 opens.

The opening of switch 144 breaks the circuit of the air solenoid 70, and the coil 70 is de-energized. The air circuit is now supplied to port 57 through port 62 and out of port 71 to bag 40. The air bag begins to inflate and forces oil through pipe 36 to the front of the cylinder 29, thus forcing the ram backwards, thereby displacing oil from the rear of the ram, this oil returning to the oil valve via oil pipe 35 to port 52. Oil returns via port 46, which is the restriction port but is spring loaded in this direction thus permitting free flow in this direction and thus fast retraction.

(5) The carriage retracts, and moves off the damping switch 101 which closes.

(6) The carriage continues to retract and strikes the back stop switch 98 thereby energising relay 146 and switch 141 opens and switches 143 and 148 close.

(7) The carriage also strikes reset switch 99.

(8) Power is applied to the air solenoid coil 70 and oil solenoid coil 50.

As coil 70 is energised, air flows from supply through port 57 to port 62 and out of port 72 to air bag 41 giving forward approach.

As coil 50 is energised, oil is displaced from the oil reservoir 39 via full flow port 45 to outlet 52 and via oil pipe 35 to the rear of the cylinder, thus giving fast forward approach.

(9) The carriage is pulled forward until the damping switch 101 is opened, and damping solenoid coil 50 is de-energised. The valve 49 reverses and oil is displaced out of the reservoir 39 via the restrictor port 46, the outlet port 52, and via oil pipe 35 to ram rear, thus giving slow forward speed (i.e. drilling speed).

(10) The slider moves and the pecking switch 110 opens, thus de-energised relay 138, and switches 147, 142 open and 144 closes.

The drill goes forward slowly.

(11) The next pecking station is reached and the pecking switch again closes, thus energising relay 138 and 147, 142 close and 144 opens.

Opening of 144 breaks the circuit of air solenoid coil 70 and coil 70 is de-energised. The air circuit is now through ports 57, 62, 71 to reverse air bag in reservoir 38. The air bag begins to inflate and forces oil out of pipe 36 to the front of the cylinder, thus forcing the ram backwards, thereby displacing oil from the rear of the ram; this oil returning to the oil valve 48 via oil pipe 35 to port 52. Oil returns to reservoir 39 via port 46 which is the restriction port but allows free flow in this direction, thus giving fast retraction.

(12) The carriage retracts, and moves off damping switch, closing it.

(13) The carriage continues to retract and strikes back stop switch 98 thereby energising relay 146 and switch 141 opens and switches 143, 148 close.

(14) The carriage also strikes the reset switch 99.

(15) The steps 8, 9 and 10 are repeated for as many "pecks" as are required.

(16) The carriage proceeds forward at damped speed, until break through switch is closed thus energising air solenoid coil 56 and air flows from supply through port 58 which is a restrictor port, to port 62 and via port 72 to forward air bag 41, giving very slow forward approach for drill break through.

(17) The carriage proceeds forward until front stop 109 is reached and front switch 150 is operated. The carriage return plunger 93, 94, 95 is also engaged, front switch breaks the circuit of the coil 131 and switch 132 opens and the motor stops. The oil and air valve solenoids 50, 70 are de-energised.

Coils 56, 70 being de-energised, air now flows from supply through ports 57, 62 out of port 71 to reverse air bag 40 giving retraction. Coil 50 being de-energised, oil, which is displaced from the ram rear returns to the oil valve 49 via oil pipe 35 to port 52 and via the port 46, which is spring loaded to permit free flow, to reservoir 39, giving fast retraction.

(18) The carriage is returned to the beginning of its stroke, and the back stop switch 98 is closed and reset switch 99 is also closed.

The sequence of operations when tapping screw-threads is as follows:

With tap-drill switch 128 closed.

(1) Press start button 123.

If reset switch 99 is relaxed, lamp will light, indicating carriage is not in place.

If carriage is in place the coil 131 is energised and closes switch 132. Power is now supplied to the solenoid coil 70, and air flows from supply through ports 57, 62 out of port 72 giving forward approach.

Power is also supplied to the oil valve coil 50 and oil is passed through the full flow port 45 and out through port 52 to the rear of the ram giving fast approach.

(2) Release start button—no action results.

(3) The carriage rides off the reset switch 99 and no action results.

(4) The carriage is pulled forward until the damping switch 101 is opened, and the damping solenoid 50 is de-energised. Oil now flows out of oil reservoir through the restrictor port 46 to outlet and port 52 to ram rear, thus giving slow forward speed (i.e. tapping speed).

(5) The carriage proceeds forward at damped speed.

(6) The break through switch is broken for tapping.

(7) The carriage proceeds forward at damped speed until the front stop switch 150 is struck.

(8) Coil 131 is de-energised and switch 132 falls out and 126 is energised. The motor reverses and switch 125 is closed. The carriage rides off the front stop 109 and retracts slowly, the speed being controlled by the restrictor 43.

(9) The carriage retracts and opens reverse stop 100, de-energising 126 and switch 125 opens.

If desired a torque overload switch may be provided. This is shown in FIGURE 2 a torque overload switch 151 may be fixed to the end plate 13 and having an operating member 152. A spring 153 is disposed between the switch housing and an abutment 154 on the arm 80. When torque on the drill exceeds a predetermined limit the arm 80 will compress the spring 153 and operate the switch which will cause retraction of the drill.

I claim:

1. A tool feed apparatus comprising in combination, a housing, a tool-holder slidably mounted in the housing for reciprocable movement therein, driving means for driving the tool-holder in its forward and backward strokes, a control device for said driving means to control the latter for reversal of movement of the tool-holder at the end of a stroke of the tool-holder, an electro-mechanical device connected to said control device for actuating the latter, switching means electrically connected to said electro-mechanical device, and movable means mounted on the housing which progressively advances step by step in accordance with the forward strokes of the tool-holder and which actuates the switching means thereby causing the tool-holder to stop and reverse direction at the end of a forward stroke which is longer than the immediately preceding forward stroke, a first stop for limiting the movement of the movable means, a projection element, a detent element, one of said elements being carried by said tool holder while the other element is carried by said movable means, one of said elements being resiliently urged into the path of movement of the other such that it permits the resiliently urged element to be repressed by the other element when the movable means engages said stop, whereupon retraction of the tool holder effects retraction of the movable means, and a second stop for limiting the return movement of the movable means whereby final return movement of the tool holder disengages said elements from each other.

2. A tool feed apparatus comprising a housing, a tool-holder slidably mounted in the housing for reciprocable movement therein, a fluid operated piston and cylinder device for driving the tool-holder in its forward and backward strokes, means for supplying oil under pressure alternately to each side of the piston of said piston and cylinder device, a control device connected to said means to control the latter for reversal of movement of the piston and tool-holder at the end of a stroke of said piston and tool-holder, an electro-mechanical device connected to said control device for actuating the latter, a slidable member mounted on the housing so as to be movable in a direction parallel to the path of the reciprocable tool-holder, a first slide device mounted in such a position as to co-act with said member, a second slide device mounted in such a position as to be engageable with said first slide device and to be moved by the latter progressively forward on each forward stroke of the piston, and switching means for controlling a supply of current to said electro-mechanical device including a contact element carried by said second slide device, a series of contacts mounted in fixed relation to said housing and electrically connected to each other over which the contact element is progressively moved from one contact to the next on each successive forward stroke of the piston, and electrical means including said contacts for controlling supply of electrical current to said electro-mechanical device.

3. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a first conduit connecting said first chamber with the cylinder of the piston and cylinder device at one side of the piston, a second chamber also on the housing, and containing the fluid, a second conduit connecting said second chamber to the said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, an electro-mechanical device connected to said control valve for actuating the latter, a slidable member mounted on the housing so as to be movable in a direction parallel to the path of the reciprocable tool-holder, a first slide device mounted on the housing in such a position as to co-act with said member, a second slide device mounted in such a position as to be engageable with said first slide device and to be moved by the latter progressively forward on each forward stroke of the piston, and switching means for controlling a supply of current to said electro-mechanical device and operable by movement of said second slide device on each successively forwardly progressive movement thereof.

4. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a first conduit connecting said first chamber with the cylinder of the piston and cylinder device at one side of the piston, a second chamber also on the housing and containing the fluid, a second conduit connecting said second chamber to said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, an electro-mechanical device connected to said control valve for actuating the latter, a first guiding means mounted on the housing parallel to the path of the reciprocable piston, a first slide device mounted on the first guiding means so as to be movable along the latter, a second guiding means mounted on the housing parallel to the path of the piston, a second slide device mounted on the second guiding means in such a position as to be engageable with said first slide device and to be moved by the latter progressively forward on each forward stroke of the piston, means connecting said piston to said slidable member so that the piston and member reciprocate simultaneously, first switching means for controlling a supply of current to said electro-mechanical device and operable by movement of said second slide device on each successively forwardly progressive movement thereof, and second switching means adjustably mounted on the housing for controlling a supply of current to said electro-mechanical device and actuated by said first slide device at the end of each bacward stroke of the first slide device in order to effect commencement of a forward stroke of the piston.

5. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber of the said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, a first electro-mechanical device connected to said control valve for actuating the latter, a second electro-mechanical device connected to said restrictor valve for actuating the latter, a slidable member mounted on the housing so as to be movable in a direction parallel to the path of the reciprocable tool-holder, a first slide device mounted on the housing in such a position as to co-act with said member, a second slide device mounted in such a position as to be engageable with said first slide device and to be moved by the latter progressively forward on each forward stroke of the piston, means connecting said piston to said slidable member so that the piston and slide device reciprocate simultaneously, first switching means for controlling a supply of current to said first electro-mechanical device and operable by movement of said first slide device on each successively forwardly progressive movement thereof, second switching means adjustably mounted on the housing for controlling a supply of current to said first electro-mechanical device and actuated by said first slide device at the end of each backward stroke of the slide device in order to effect commencement of a forward stroke of the piston, and third switching means electrically connected to said second electro-mechanical device and mounted on said second slide device to be operable by said first slide device prior to the end of each forward stroke in order that the flow through the first conduit be restricted thereby slowing down the tool-holder until the latter has reached the end of its stroke.

6. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a first movable wall device situated within the first chamber, a second movable wall device situated within the second chamber, a first control valve connected to said first and second movable wall devices by third and fourth conduits respectively, means for supplying air under pressure to said first control valve which conducts the air alternately to said third and fourth conduits, a first electro-mechanical device connected to said control valve for actuating the latter, a second electro-mechanical device connected to said restrictor valve for actuating the latter, a second control valve connected between said first control valve and said air supply means, said second control valve having two ports connected to said first control valve one of which ports being provided with a restrictor element, a third electro-mechanical device connected to said second control valve for actuating the latter to give to said first control valve alternately full rate of flow of air and restricted flow for slow forward movement of the tool-holder at the end of an operation, a slidable member mounted on the housing so as to be movable in a direction parallel to the path of the reciprocable tool-holder, a first slide device mounted in such a position as to co-act with said member, a second slide device mounted in such position as to be engageable with said first slide device and to be moved progressively forward by the latter on each forward stroke of the piston, means connecting said piston to said slidable member so that the piston and member reciprocate simultaneously, first switching means for controlling a supply of current to said first electro-mechanical device and operable by movement of said first slide device on each successively forwardly progressive movement thereof, second switching means adjustably mounted on the housing for controlling a supply of current to said first electro-mechanical device and actuated by said first slide device at the end of each backward stroke thereof in order to effect commencement of a forward stroke of the piston, third switching means mounted on said second slide device and electrically connected to said second electro-mechanical device to be operable by said first slide device prior to the end of each successive forward stroke in order that the flow through the first conduit be restricted, thereby slowing down the tool-holder until the latter has reached the end of said stroke, a fourth switching means adjustably mounted on said housing and electrically connected to said third electro-mechanical device, said fourth switching means being adjusted so as to be operated at the end of the final forward stroke of an operation.

7. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, a first electro-mechanical device connected to said control valve for actuating the latter, a second electro-mechanical device connected to said restrictor valve for actuating the latter, a first slide device mounted on the housing, a second slide device engageable with said first slide device to be movable thereby, means connecting said piston to said first slide device so that the piston and first slide device reciprocates simultaneously, a nose carried by said first slide device, having a recess, a spring loaded pin carried by said second slide device and engageable with the end of said nose to move the second slide device progressively forward on each forward stroke of the piston and engageable with said recess at the end of an operation so that the second slide device is returned to the start position at the end of the final backward stroke of the operation, first switching means for controlling a supply of current to said first electro-mechanical device and operable by movement of said first slide device on each successively forwardly progressive movement thereof, second switching means adjustably mounted on the housing for controlling a supply of current to said first electro-mechanical device and actuated by said first slide device at the end of each backward stroke thereof in order to effect commencement of a forward stroke of the piston, third switching means electrically connected to said second electro-mechanical device and mounted on said second slide device to be operable by said first slide device prior to the end of each forward stroke in order that the flow through the first conduit be restricted thereby slowing down the tool-holder until the latter has reached the end of said stroke.

8. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, a first electro-mechanical device connected to said control valve for actuating the latter, a second electro-mechanical device connected to said restrictor valve for actuating the latter, a first slide device mounted on the housing, a second slide device engageable with said first slide device to be movable thereby, means connecting said piston to said first slide device so that the piston and first slide device reciprocate simultaneously, a nose carried by said slide device, having a recess, a spring loaded pin carried by said second slide device and engageable with the end of said nose to move the second slide device progressively forward on each forward stroke of the piston and engageable with said recess at the end of an operation so that the second slide device is returned to the start position at the end of the final backward stroke of the operation, first switching means for controlling a supply of current to said first electro-mechanical device and operable by movement of said first slide device on each successively forwardly progressive movement thereof, second switching means adjustably mounted on the housing for controlling a supply of current to said first electro-mechanical device and actuated by said first slide device at the end of each backward stroke thereof to effect commencement of a forward stroke of the piston, third switching means electrically connected to said second electro-mechanical device and mounted on said second slide device, and a probe mounted on said first slide device to operate said third switching means prior to the end of each forward stroke in order that the flow through the first conduit be restricted thereby slowing down the tool-holder until the latter has reached the end of said stroke.

9. A tool feed device according to claim 6 including a fifth switching means adjustably mounted on the housing, which fifth switching means when operated controls the supply of current through said first, second and third electro-mechanical devices, said fifth switching means being operable by said said second slide device after the final forward stroke has been completed at the end of an operation.

10. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a first restrictor valve having two ports openings into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a second restrictor valve in said second conduit which valve can be adjusted for slow running of the piston and consequently the tool-holder, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, a first electro-mechanical device connected to said control valve for actuating the latter, a second electro-mechanical device connected to said restrictor valve for actuating the latter, a first slide device mounted on the housing, a second slide device engageable with said first slide device to be movable thereby, means connecting said piston to said first slide device so that the piston and first slide device reciprocate simultaneously, first switching means for controlling a supply of current to said first electro-mechanical device and operable by movement of said first slide device on each successively forwardly progressive movement thereof, second switching means adjustably mounted on the housing for controlling a supply of current to said first electro-mechanical device and actuated by said first slide device at the end of each backward stroke thereof to effect commencement of a forward stroke of the piston, and third switching means electrically connected to said second electro-mechanical device and mounted on said second slide device to be operable by said first slide device prior to the end of each forward stroke in order that the flow through the first conduit be restricted thereby slowing down the tool-holder until the latter has reached the end of its stroke.

11. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a first movable wall device situated within the first chamber, a second movable wall device situated within the second chamber, a control valve connected to said first and second movable wall devices by third and fourth conduits respectively, means for supplying air under pressure to said control valve which conducts the air alternately to said third and fourth conduits, a first electro-mechanical device connected to said control valve for actuating the latter, a second electro-mechanical device connected to said restrictor valve for actuating the latter, a slide device mounted on the housing, a second slide device engageable with said first slide device to be movable thereby, means connecting said piston to said first slide device so that the piston and first slide device reciprocate simultaneously, a nose carried by said slide device, having a recess, a spring loaded pin carried by said second slide device and engageable with the end of said nose to move the second slide device progressively forward on each forward stroke of the piston and engageable with said recess at the end of an operation so that the second slide device is returned to the start position at the end of the final backward stroke of the operation, first switching means for controlling a supply of current to said first electro-mechanical device including a resilient contact element carried by said second slide device, a bar of electrically non-conducting substance fixed to the housing and having a plurality of openings, a plurality of contact pins removably located in said openings to form a series of contacts over which the contact element is progressively moved from one contact pin to the next on each successive forward stroke of the piston, a conductor bar to which said series of contacts is electrically connected, second switching means adjustably mounted on the housing for controlling a supply of current to said first electro-mechanical device and actuated by said first slide device at the end of each backward stroke thereof in order to effect commencement of a forward stroke of the piston, third switching means electrically connected to said second electro-mechanical device and mounted on said second slide device, and a probe mounted on said first slide device to operate said third switching means prior to the end of each forward stroke in order that the flow through the first conduit be restricted thereby slowing down the tool-holder until the latter has reached the end of said stroke.

12. A tool feed apparatus comprising a housing, a tool-holder slidably mounted in the housing for reciprocable movement therein, a fluid operated piston and cylinder device for driving the tool-holder in its forward and backward strokes, a first chamber mounted on the housing containing fluid for operating the piston, a restrictor valve having two ports opening into said first chamber, one of said ports housing a one-way restricted flow valve element, a first conduit connected between a further port of said restrictor valve and the cylinder of the piston and cylinder device at one side of the piston, a second chamber also on the housing and containing the fluid, a second conduit connecting said second chamber to the said cylinder at the other side of said piston, a first movable wall device situated within the first chamber, a second movable wall device situated within the second chamber, a first control valve connected to said first and second movable wall devices by third and fourth conduits respectively, means for supplying air under pressure to said first control valve which conducts the air alternately to said third and fourth conduits, a first electro-mechanical device connected to said control valve for actuating the latter, a second electro-mechanical device connected to said restrictor valve for actuating the latter, a second control valve connected between said first control valve and said air supply means, said second control valve having two ports connected to said first control valve one of which ports being provided with a restrictor element, a third electro-mechanical device connected to said second control valve for actuating the latter to give to said first control valve alternately full rate of flow of air and restricted flow for slow forward movement of the tool-holder at the end of an operation, a first slide device mounted on the housing, a second slide device engageable with said first slide device to be movable thereby, means connecting said piston to said first slide device so that the piston and first slide device reciprocate simultaneously, a nose carried by said slide device, having a recess, a spring loaded pin carried by said second slide device and engageable with the end of said nose to move the second slide device progressively forward on each forward stroke of the piston and engageable with said recess at the end of an operation so that the second slide device is returned to the start position at the end of the final backward stroke of the operation, a projection adjustably mounted on the housing and engageable with said second slide device in such manner as to effect disengagement of said spring loaded pin and said recess, first switching means for controlling a supply of current to said first electro-mechanical device including a contact element carried by said second slide device and a series of contacts electrically connected to each other over which the contact element is progressively moved from one contact to the next on each successive forward stroke of the piston, second switching means adjustably mounted on the housing for controlling a supply of current to said first electromechanical device and actuated by said first slide device at the end of each backward stroke thereof in order to effect commencement of a forward stroke of the piston, third switching means electrically connected to said second electro-mechanical device and mounted on said second slide device to be operable by said first slide device prior to the end of each forward stroke in order that the flow through the first conduit be restricted thereby slowing down the tool-holder until the latter has reached the end of its stroke, a fourth switching means adjustably mounted on said housing and electrically connected to said third electro-mechanical device, said fourth switching means being adjusted so as to be operated by said second slide device towards the end of the final forward stroke of an operation, a fifth switching means adjustably mounted on the housing which fifth switching means controls current supply through the first, second and third electro-mechanical devices, said fifth switching means being operable by the second slide device after the final forward stroke has been completed at the end of an operation, a sixth switching means having co-operating parts mounted on said projection and a said second slide device, and an indicator circuit connected to said sixth switching means said sixth switching means breaking the circuit to said first, second and third electro-mechanical devices until the second slide device engages the said projection, the provision of said indicator device and said sixth switching means ensuring correct resetting of said second slide device, said spring loaded pin, and said recess before commencement of an operation.

References Cited in the file of this patent
UNITED STATES PATENTS 2,903,918   Rufer ------------------ Sept. 15, 1959